United States Patent
Maruoka et al.

(10) Patent No.: US 11,110,818 B2
(45) Date of Patent: Sep. 7, 2021

(54) VEHICLE STRUCTURE

(71) Applicant: HONDA MOTOR CO., LTD., Tokyo (JP)

(72) Inventors: Ryoji Maruoka, Wako (JP); Shohei Matsuyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/822,309

(22) Filed: Mar. 18, 2020

(65) Prior Publication Data

US 2020/0307415 A1    Oct. 1, 2020

(30) Foreign Application Priority Data

Mar. 28, 2019   (JP) .............................. JP2019-063236

(51) Int. Cl.
  *B60N 2/015*   (2006.01)
  *B60N 2/75*    (2018.01)
  *B60N 2/20*    (2006.01)

(52) U.S. Cl.
  CPC ............... *B60N 2/015* (2013.01); *B60N 2/20* (2013.01); *B60N 2/767* (2018.02); *B60N 2/787* (2018.02); *B60N 2/793* (2018.02)

(58) Field of Classification Search
  CPC ........ B60N 2/015; B60N 2/787; B60N 2/767; B60N 2/793; B60N 2/20
  See application file for complete search history.

(56) References Cited

U.S. PATENT DOCUMENTS

| | | | | |
|---|---|---|---|---|
| 3,140,895 A | * | 7/1964 | Straumann | B60N 2/787 312/235.6 |
| 5,096,256 A | * | 3/1992 | Mouri | B60N 2/757 297/113 |
| 5,752,739 A | * | 5/1998 | Saeki | B60N 2/757 297/113 |
| 6,802,174 B2 | * | 10/2004 | Krausz | B60R 7/088 53/474 |
| 10,081,284 B2 | * | 9/2018 | Wu | B60N 2/757 |
| 10,093,215 B2 | * | 10/2018 | Raab | B60N 2/757 |
| 2014/0125107 A1 | * | 5/2014 | Cha | B60N 2/757 297/411.3 |

FOREIGN PATENT DOCUMENTS

| | | |
|---|---|---|
| JP | 2001-037578 A | 2/2001 |
| JP | 2004-065762   | 3/2004 |
| JP | 2007-153221 A | 6/2007 |
| JP | 2011-031737 A | 2/2011 |

OTHER PUBLICATIONS

Japanese Office Action with English Translation dated Dec. 22, 2020, 9 pages.

* cited by examiner

*Primary Examiner* — Philip F Gabler
(74) *Attorney, Agent, or Firm* — Rankin, Hill & Clark LLP

(57) ABSTRACT

The vehicle structure includes seats provided away from each other in a vehicle width direction, a support provided on a vehicle floor, and attached between the seats, a vehicle structural part provided between the seats, and an armrest detachably attached to the support.

7 Claims, 5 Drawing Sheets

VEHICLE STRUCTURE

INCORPORATION BY REFERENCE

The present application claims priority under 35 U.S.C. § 119 to Japanese Patent Application No. 2019-063236 filed on Mar. 28, 2019. The content of the applications is incorporated herein by reference in its entirety.

BACKGROUND OF THE INVENTION

Field of the Invention

The present invention relates to a vehicle structure.

Description of the Related Art

In general, a vehicle structure is known in which a rear seat can be divided and brought down forward, and a seat back of an empty seat is brought down forward for use in a case where no occupant is seated on the seat and a luggage compartment needs to be enlarged.

As this vehicle structure, a technology has been heretofore disclosed in which, for example, a housing recessed part recessed deeper than a back face is formed on a back face side of a seat back, and an armrest is provided so as to be housed in the housing recessed part, rotatably coupled to an edge side on an opening side of the housing recessed part and rotated about the edge side to be placed on the back face (e.g., Japanese Patent Laid-Open No. 2004-065762).

In the technology described in the above patent literature, however, a conventional armrest structure obstructs a seat arrangement and narrows a luggage space in a case where a structural part extending in a front-back direction is present in a vehicle central part.

Furthermore, if a central part of a rear seat is removed, the seat is divided right and left and an armrest is attached to each seat, the seat arrangement is not obstructed even if the central structural part is present, but a width of each seat decreases.

An aspect of the present invention has been developed in view of the above described issue, and an object thereof is to provide a vehicle structure in which even if a structural part is present in a central part of a vehicle, a seat arrangement is not obstructed, both a luggage space and a seat width can be obtained, and indoor utilities and comfort of a seated state can improve.

SUMMARY OF THE INVENTION

To achieve the above object, a vehicle structure according to an aspect of the present invention includes seats provided away from each other in a vehicle width direction, a support provided on a vehicle floor, and attached between the seats, a vehicle structural part provided between the seats, and an armrest detachably attached to the support.

Thus, the support is provided between the seats, and the armrest is detachably attached to this support. Consequently, even if a vehicle structural part is present in a center of a vehicle, the seats can be folded while avoiding the vehicle structural part, and a seat arrangement can be prevented from being obstructed. Furthermore, since the armrest is provided between the seats, the armrest can be used in a state where a seat width is acquired, and since both a luggage space and the seat width can be acquired, indoor utilities improve.

In the above configuration, the armrest may include a coupling portion, and the support may include an attaching portion to hold the coupling portion.

Consequently, the armrest is detachably attached to the support via the coupling portion.

In the above configuration, the coupling portion may include a plurality of cutouts provided at a predetermined interval, and the attaching portion may include an engagement portion that engages with at least one cutout of the plurality of cutouts to hold the coupling portion.

Consequently, an engagement position of the cutout to be engaged with the engagement portion is changeable, and hence a height position of the armrest can be adjusted.

In the above configuration, the armrest may include a rotary shaft.

Consequently, the armrest is rotated about the rotary shaft, and can be held thereby at a use position or a non-use position.

In the above configuration, an article storage part may be provided in the support.

Consequently, an occupant of the vehicle can utilize the article storage part. Furthermore, a height of the armrest is adjusted to a high position. Therefore, even if the armrest is held at the use position, the article storage part formed in the support can be used.

In the above configuration, each of the seats may include a seat cushion and a seat back, and be configured to be foldable to a storage position, and a height position of a back face upper part of the seat back in a state where the seat is in the storage position, a height position of an upper surface of the support, and a height position of an upper surface of the vehicle structural part may be equal.

Thus, since the height position of the back face upper part of the seat back in the state where the seat is in the storage position, the height position of the upper surface of the support and the height position of the upper surface of the vehicle structural part are equal, the luggage space can be flat, and the indoor utilities further improve.

In the above configuration, the vehicle structural part may be a structural part to protect or store vehicle parts or a center console.

Consequently, even in a vehicle in which a large vehicle structural part is present, the luggage space can be flat, and the indoor utilities can improve.

According to an aspect of the present invention, even if a vehicle structural part is present in a center of a vehicle, both a luggage space and a seat width can be acquired without obstructing any seat arrangement. As a result, indoor utilities and comfort of a seated state can improve.

DETAILED DESCRIPTION OF THE PREFERRED EMBODIMENTS

Hereinafter, an embodiment of the present invention will be described with reference to the drawings.

Figure 1:
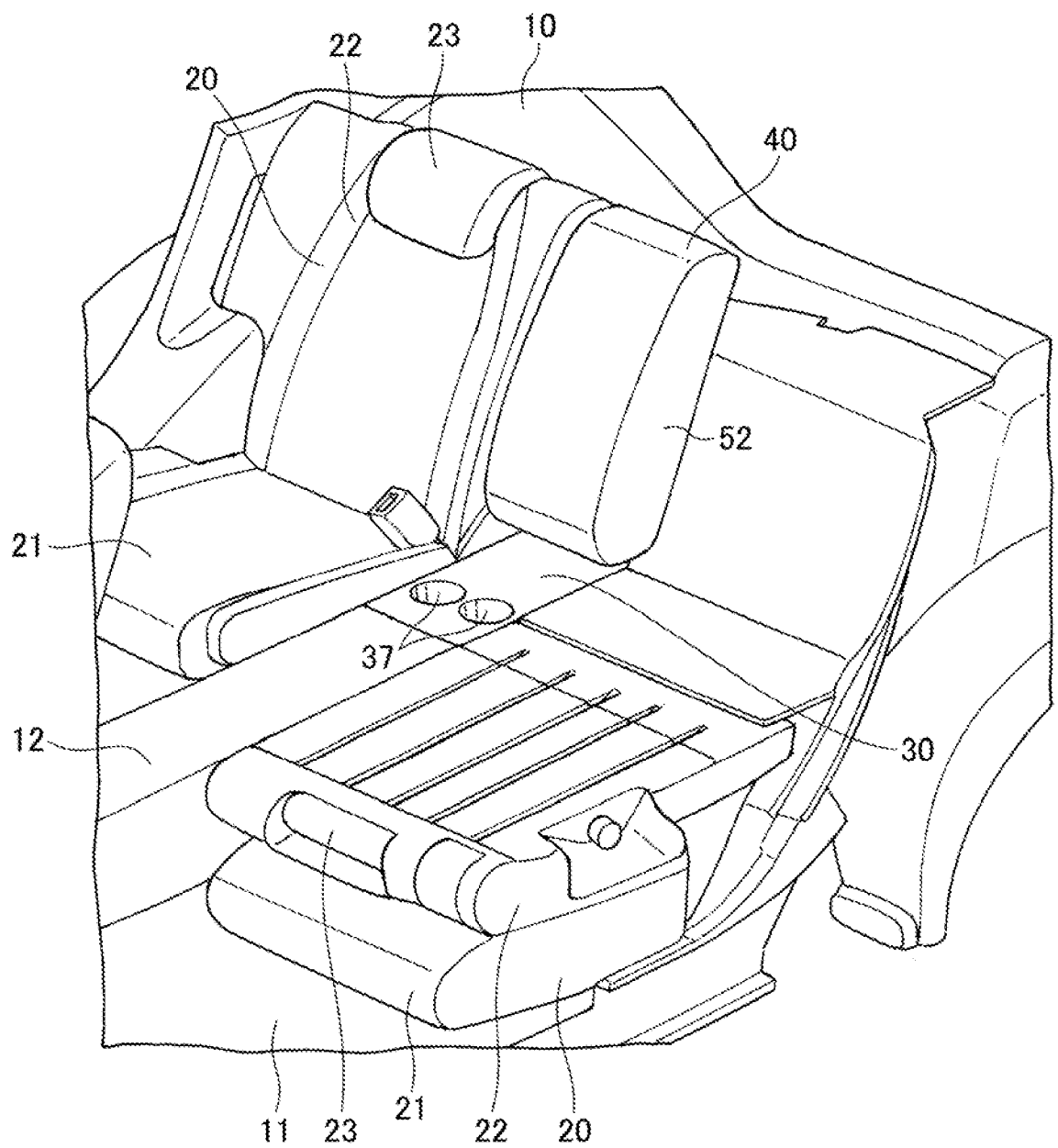
FIG. 1 is a perspective view showing a vehicle structure according to an embodiment of the present invention.
Figure 2:
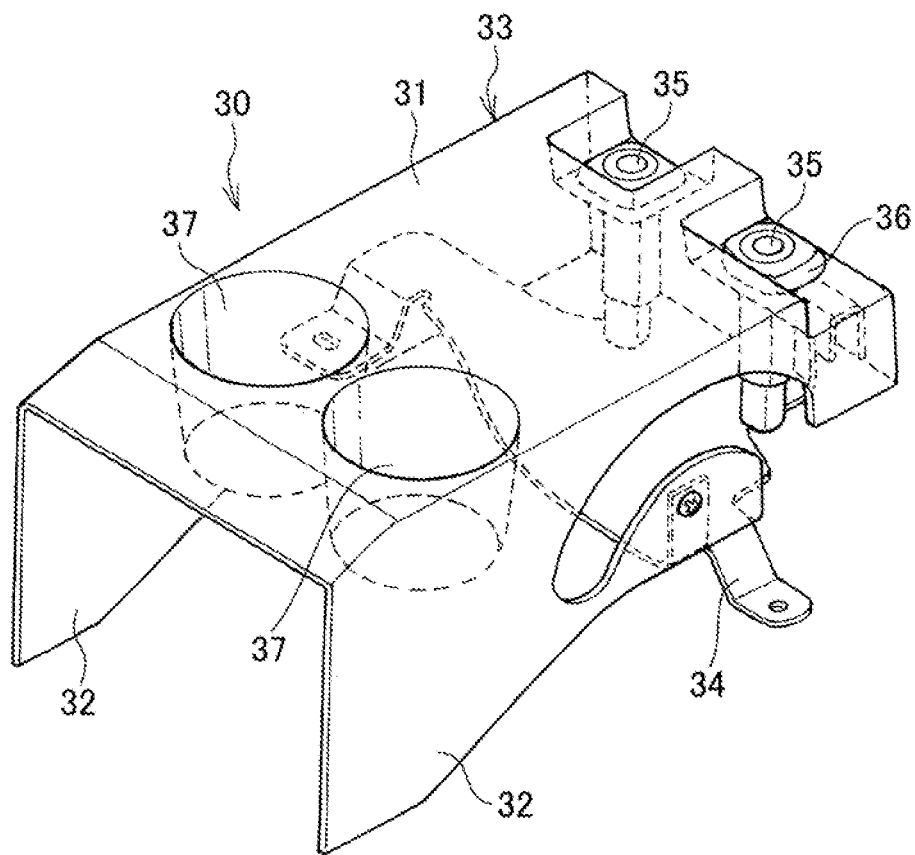
FIG. 2 is a perspective view showing a support of the present embodiment.
Figure 3:
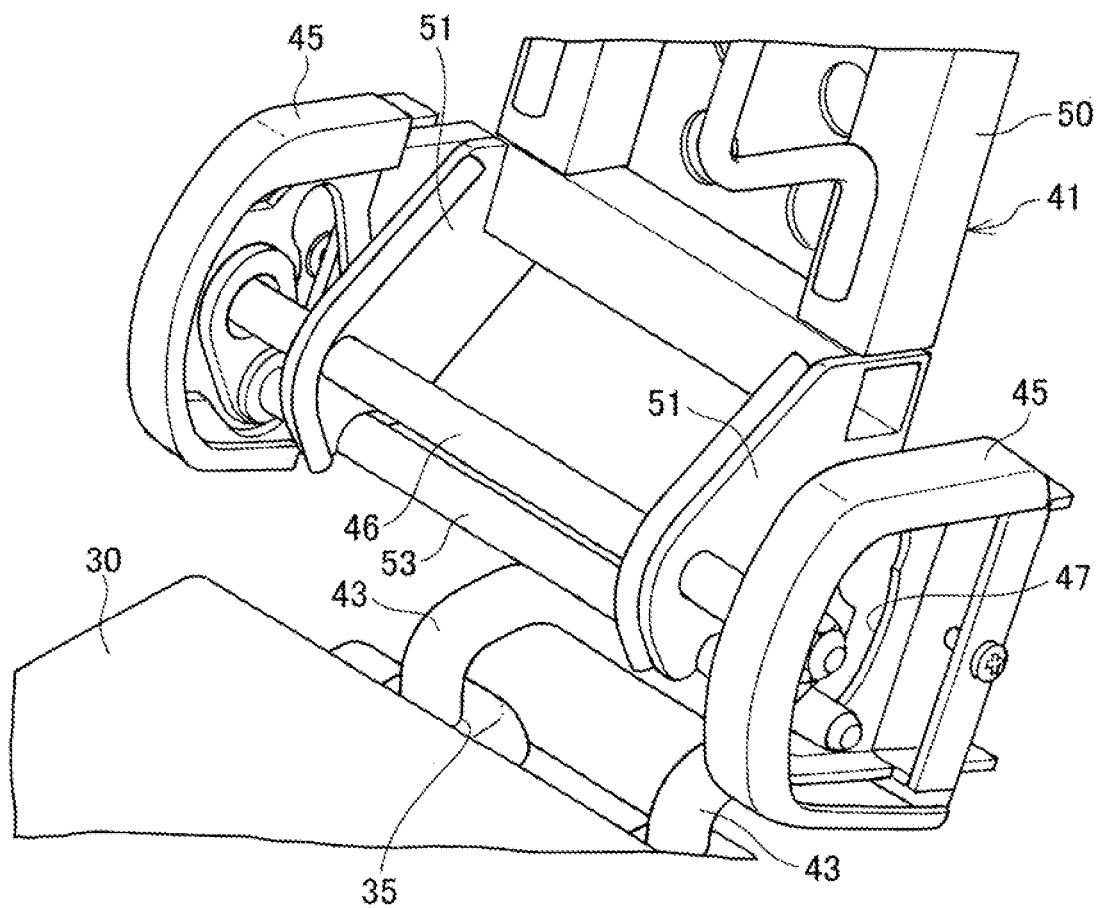
FIG. 3 is a perspective view showing the support and an armrest.
Figure 4:
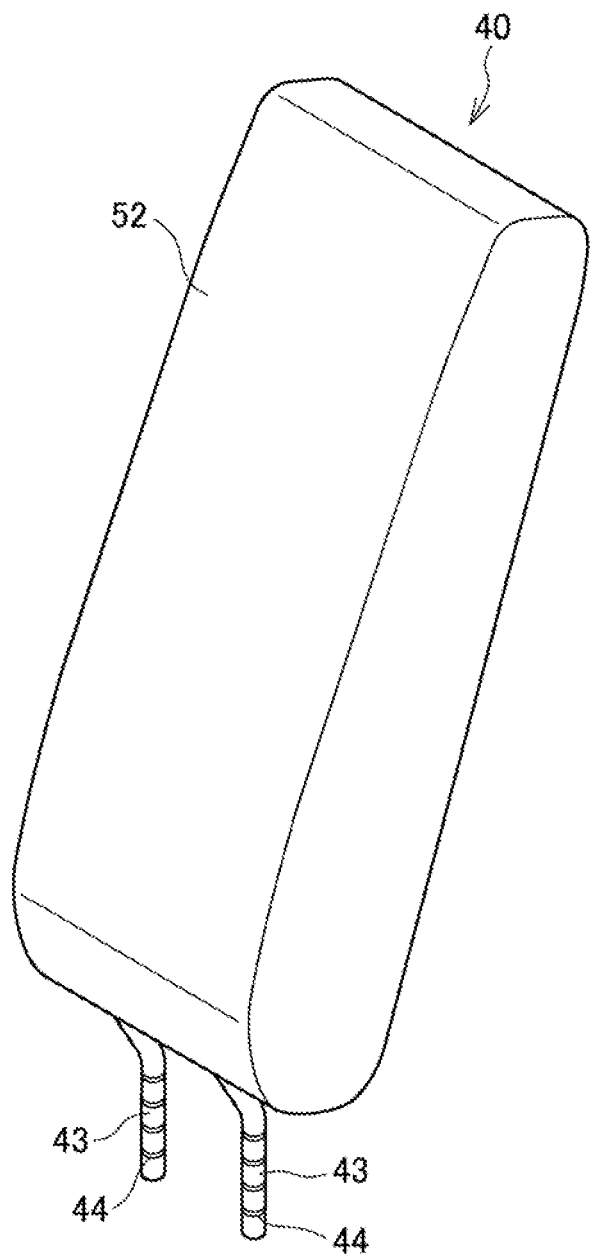
FIG. 4 is a perspective view showing the armrest.
Figure 5:
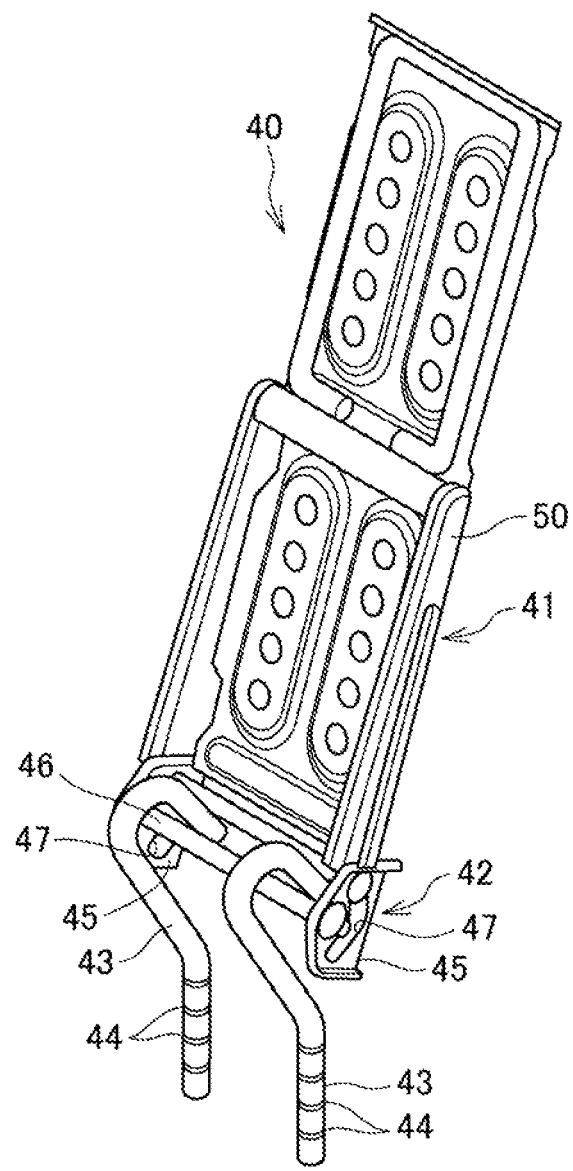
FIG. 5 is a perspective view showing a frame and a support member of the armrest.

FIG. 1 is a perspective view showing a vehicle structure according to the present embodiment. FIG. 2 is a perspective view showing a support of the present embodiment. FIG. 3 is a perspective view showing the support and an armrest. FIG. 4 is a perspective view showing the armrest. FIG. 5 is a perspective view showing a frame and a support member of the armrest.

Note that in the following description, front, rear, right and left mean front, rear, right and left seen from a seated state in a seat of a vehicle.

As shown in FIG. 1, in a rear part of a vehicle 10, two seats 20 are arranged away from each other by a predetermined amount in a vehicle width direction.

A vehicle structural part 12 to be arranged between the respective seats 20 is attached to a vehicle floor 11. The vehicle structural part 12 is a large structural part extending in a front-back direction of the vehicle 10 in an almost central part of the vehicle 10 in the width direction, such as a structural part to protect or store vehicle parts or a center console.

Each of the seats 20 includes a seat cushion 21 supported by a seat cushion frame (not shown), a seat back 22 supported by a seat back frame (not shown) and swingably coupled to the seat cushion frame, and a head rest 23 attached to the seat back 22.

The seat 20 is configured to be foldable by bringing the seat back 22 down forward. In the present embodiment, the seat cushion frame is a type of frame that is sunk downward by a link mechanism in a state where the seat back 22 is folded. Thus, the seat 20 is a folding seat 20 (a first folding seat 20) having the seat cushion 21 and the seat back 22 that are sunk downward by folding the seat back 22.

In this case, according to the present embodiment, the first folding seat 20 is configured so that a height position of a back face of the seat back 22 is equal to a height position of an upper surface of the vehicle structural part 12.

Note that the seat 20 may be a type of seat 20 that has the seat back 22 that is folded by moving the seat back frame to the seat cushion frame (a second folding seat).

In this second folding seat 20, unlike the first folding seat 20, the seat cushion 21 is not sunk downward, and hence a height of the back face of the seat back 22 increases. Therefore, a height of the vehicle structural part 12 may be adjusted to the height of the back face of the folded seat back 22 so that the heights are equal.

A support 30 is provided between the respective seats 20. The support is formed so that a height position of an upper surface of the support 30 is almost equal to the height position of the upper surface of the vehicle structural part 12.

As shown in FIG. 2, the support 30 includes a cover member 33 including an upper plate 31 and side plates 32 extending downward from opposite side edges of the upper plate 31.

The cover member 33 is fixed to the vehicle floor 11 via a floor fastening bracket 34. At a rear end of the cover member 33, two attaching portions 35 formed as tubular recessed portions are provided, and in one of the attaching portions 35, an engagement portion 36 that forms a lock mechanism is provided. As the lock mechanism, for example, a known mechanism similar to a lock mechanism that fixes the head rest 23 of the seat 20 is used.

Furthermore, in a front of the support 30, two article storage parts 37 are provided. Each of the article storage parts 37 is configured to store an article such as an occupant's belonging, and may be used, for example, as a cup holder for a beverage containing cup or plastic bottle, a storage pocket to store a small article such as a smartphone, or the like.

As shown in FIG. 3 to FIG. 5, an armrest 40 is detachably attached to the support 30.

The armrest 40 includes an armrest body 41 and a support member 42. The support member 42 includes a pair of pipe-like coupling portions 43, and each of the coupling portions 43 is detachably inserted in and supported by the attaching portion 35 of the support 30.

Each of the coupling portions 43 includes, in an outer peripheral surface thereof, a plurality of groove-like cutouts 44 provided at a predetermined interval in a length direction. Furthermore, the coupling portion 43 is inserted in the attaching portion 35 to engage the engagement portion 36 with one of the cutouts 44, thereby fixing the coupling portion 43 to the attaching portion 35. Furthermore, the engagement portion 36 is disengaged from the cutout 44, so that the armrest 40 can be removed from the attaching portion 35 of the support 30 via the coupling portion 43.

An upper portion of the coupling portion 43 of the support member 42 is bent rearward in an almost U-shape, and on opposite sides of upper ends of the coupling portions 43, a pair of rotation support members 45 are provided.

The rotation support members 45 rotatably support the armrest 40, and a rotary shaft 46 is supported between two rotation support members 45.

Furthermore, arc-shaped guide grooves 47 are formed on a vehicle rear side of the rotary shaft 46 between the rotation support members 45.

The armrest body 41 includes a plate frame 50, and a pair of support plates 51 attached integrally to opposite sides of a base of the frame 50.

The surface of the frame 50 is covered with an armrest cushion 52.

Each of the support plates 51 extends diagonally downward and forward from the base of the frame 50, and the rotary shaft 46 extends through the support plate 51. Consequently, the support plate 51 is rotatable about the rotary shaft 46.

A guide shaft 53 is provided below the rotary shaft 46 between the support plates 51 as shown in FIG. 3. Opposite ends of the guide shaft 53 are inserted in the guide grooves 47 of the rotation support members 45, respectively.

The guide shaft 53 is movable along the guide grooves 47, and the guide shaft 53 is moved along the guide grooves 47, so that the armrest 40 is movable between a use position where the armrest 40 is rotated forward to an almost horizontal state and a non-use position where the armrest 40 is rotated rearward substantially to a position of the seat back 22. Consequently, it is possible to hold the armrest 40 at the use position or the non-use position.

The armrest 40 is configured so that a position of the cutout 44 to be engaged with the engagement portion 36 can be adjusted to adjust a height position of the armrest.

Next, an operation of the present embodiment will be described.

First, when using the armrest 40, the armrest 40 is rotated forward in the vehicle, and the guide shaft 53 is moved along the guide grooves 47, so that the armrest 40 is brought down to the use position in the almost horizontal state. In this state, the armrest 40 can be used.

Furthermore, the position of the cutout 44 to be engaged with the engagement portion 36 is adjusted, so that the height position of the armrest 40 can be adjusted. Thus, a height of the armrest 40 is adjusted to a high position, so that the article storage parts 37 formed in the support 30 can be used also in a case where the armrest 40 is held at the use position.

Next, when folding the seat 20, the seat back 22 is brought down forward to fold the seat 20. In this state, the height position of the back face of the seat back 22 is equal to the height position of the upper surface of the vehicle structural part 12 in the present embodiment.

Consequently, the back face of the seat back 22, the vehicle structural part 12 and the support 30 are brought to a flat height position, and a luggage space that is easy to use can be acquired.

In this case, since the armrest 40 is detachably attached, the engagement portion 36 of the support 30 is disengaged from the cutout 44 of the coupling portion 43, to remove the armrest 40 from the attaching portion 35 of the support 30 via the coupling portion 43, thereby making it possible to acquire a larger storage space.

As described above, in the present embodiment, the vehicle structure includes the seats 20 provided away from each other in the vehicle width direction, the support 30 provided on the vehicle floor 11, and attached between the seats 20, the vehicle structural part 12 provided between the seats 20, and the armrest 40 detachably attached to the support 30.

Thus, the support 30 is provided between the seats 20, and the armrest 40 is detachably attached to this support 30. Consequently, even if the vehicle structural part 12 is present in a center of the vehicle, the seats 20 can be folded while avoiding the vehicle structural part 12, and a seat arrangement can be prevented from being obstructed. Furthermore, since the armrest 40 is provided between the seats 20, the armrest 40 can be used in a state where a width of each seat 20 is acquired, and since both the luggage space and the width of the seat 20 can be acquired, indoor utilities and comfort of a seated state can eventually improve.

Furthermore, in the present embodiment, the armrest 40 includes the coupling portion 43, and the support 30 includes the attaching portion 35 to hold the coupling portion 43.

Consequently, the armrest 40 is detachably attached to the support 30 via the coupling portion 43.

Additionally, according to the present embodiment, in the coupling portion 43, the plurality of cutouts 44 are provided at the predetermined interval, and the attaching portion 35 includes the engagement portion 36 that engages with at least one cutout 44 of the plurality of cutouts 44 to hold the coupling portion 43.

Consequently, an engagement position of the cutout 44 to be engaged with the engagement portion 36 is changeable, and hence the height position of the armrest 40 can be adjusted.

Furthermore, in the present embodiment, the armrest 40 includes the rotary shaft 46.

Consequently, the armrest 40 is rotated about the rotary shaft 46, and can be held thereby at the use position or the non-use position.

Additionally, according to the present embodiment, in the support 30, the article storage part 37 is provided.

Consequently, an occupant of the vehicle can utilize the article storage part 37. Furthermore, the height of the armrest 40 is adjusted to the high position. Therefore, even if the armrest 40 is held at the use position, the article storage part 37 formed in the support 30 can be used.

Furthermore, in the present embodiment, each of the seats 20 includes the seat cushion 21 and the seat back 22, and is configured to be foldable to a storage position, and a height position of a back face upper part of the seat back 22 in a state where the seat 20 is in the storage position, the height position of the upper surface of the support 30, and the height position of the upper surface of the vehicle structural part 12 are equal.

Thus, since the height position of the back face upper part of the seat back 22 in the state where the seat 20 is in the storage position, the height position of the upper surface of the support 30 and the height position of the upper surface of the vehicle structural part 12 are equal, the luggage space can be flat, and the indoor utilities further improve.

Additionally, in the present embodiment, the vehicle structural part 12 is the structural part to protect or store the vehicle parts or the center console.

Consequently, even in the vehicle in which the large vehicle structural part 12 is present, the luggage space can be flat, and the indoor utilities can improve.

Note that the above embodiment is merely an implementation of the present invention, and can be arbitrarily modified and applied without departing from the gist of the present invention.

For example, in the above embodiment, it has been described that the vehicle structural part 12 and the support 30 are separately provided, but the present invention is not limited to this example, and the vehicle structural part 12 and the support 30 may be integrally provided.

REFERENCE SIGNS LIST 10 vehicle
11 vehicle floor
12 vehicle structural part
20 seat
21 seat cushion
22 seat back
30 support
35 attaching portion
36 engagement portion
37 article storage part
40 armrest
43 coupling portion
44 cutout
46 rotary shaft
53 guide shaft

What is claimed is:

1. A vehicle structure comprising:
seats provided away from each other in a vehicle width direction,
a support provided on a vehicle floor, and attached between the seats,
a vehicle structural part provided between the seats, and
an armrest detachably attached to the support,
wherein each of the seats comprises a seat cushion and a seat back, and is configured to be foldable to a storage position,
a height position of a back face upper part of the seat back in a state where the seat is in the storage position, a height position of an upper surface of the support, and a height position of an upper surface of the vehicle structural part are equal, and
the armrest is detachable in a condition which the seats are in the storage position.

2. The vehicle structure according to claim 1, wherein the armrest comprises a coupling portion, and
the support comprises an attaching portion to hold the coupling portion.

3. The vehicle structure according to claim 2, wherein the coupling portion includes a plurality of cutouts provided at a predetermined interval, and
   the attaching portion includes an engagement portion that engages with at least one cutout of the plurality of cutouts to hold the coupling portion.

4. The vehicle structure according to claim 3, wherein the armrest is configured so that a position of the cutout to be engaged with the engagement portion can be adjusted to adjust a height position of the armrest.

5. The vehicle structure according to claim 1, wherein the armrest comprises a rotary shaft.

6. The vehicle structure according to claim 1, wherein an article storage part is provided in the support.

7. The vehicle structure according to claim 1, wherein the vehicle structural part is a structural part to protect or store vehicle parts or a center console.

* * * * *